Sept. 1, 1964

D. C. WHITNEY

3,146,531

TEACHING DEVICE

Filed Oct. 2, 1961

INVENTOR.
DAVID C. WHITNEY
BY
Brangley, Baird, Clayton, Miller & Vogel
ATTYS.

United States Patent Office 3,146,531
Patented Sept. 1, 1964

3,146,531
TEACHING DEVICE
David C. Whitney, Deerfield, Ill., assignor to Field Enterprises Educational Corporation, Chicago, Ill., a corporation of Delaware
Filed Oct. 2, 1961, Ser. No. 142,128
24 Claims. (Cl. 35—9)

This invention relates to teaching devices and particularly to teaching devices of the self-teaching type.

It is an important object of the present invention to provide an improved teaching device of the type in which a test sheet carrying questions and correct answers and a work sheet carrying answer spaces and scoring spaces are arranged in such relationship that the student after writing his answer in the answer space with the correct answer covered can thereafter uncover the correct answer to compare it with his answer and score himself in the appropriate scoring space.

Another object of the invention is to provide an improved teaching device of the type set forth wherein the questions and the correct answers on the test sheet are arranged in concentric circular paths and the answer spaces and the scoring spaces on the work sheet are arranged in concentric circular paths and cooperate with a cover having windows therein and rotate with respect thereto so as to display through appropriate windows a question to be answered on the test sheet and the corresponding answer space on the work sheet while simultaneously displaying the previous question and the corresponding answer on the test sheet and the corresponding answer space and scoring space on the work sheet.

Still another object of the invention is to provide an improved teaching device of the type set forth wherein a support wheel is mounted on a base and has mounted thereon for rotation therewith a test sheet and a work sheet, the base also having mounted thereon a cover having suitable windows therethrough revealing appropriate portions of the test sheet and the work sheet.

Yet another object of the invention is to provide an improved teaching device of the type set forth having means to permit turning of the support wheel carrying the test sheet and the work sheet in only one direction with respect to the associated base whereby to insure that the questions on the test sheet are displayed in proper sequence to the student.

Still another object of the invention is to provide in a teaching device of the type set forth, a plurality of transparent panes in appropriate windows and means permitting rotation of the test sheet in only one direction so that the student cannot change his written answer to a question after the correct answer thereto has been brought into view.

A further object of the invention is to provide an improved test sheet and an improved work sheet for use in a teaching device of the type set forth.

A still further object of the invention is to provide an improved teaching device of the type set forth which is simple in construction, economical to manufacture, and simple and economical to use.

Further features of the invention pertain to the particular arrangement of the elements of the teaching device including the improved test sheet and work sheet therefor, whereby the above-outlined and additional operating features thereof are attained.

The invention, both as to its organization and method of operation, together with further objects and advantages thereof will best be understood by reference to the following specification taken in conjunction with the accompanying drawings, in which.

Figure 1:
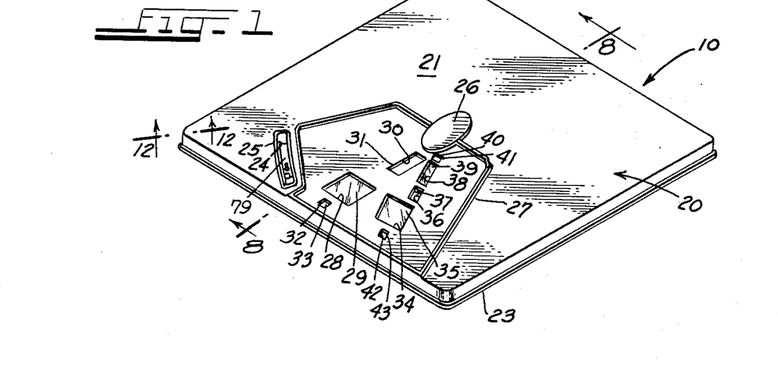
FIGURE 1 is a perspective view of a teaching device made in accordance with and embodying the principles of the present invention.
Figures 8, 9, 10, 11, 12:
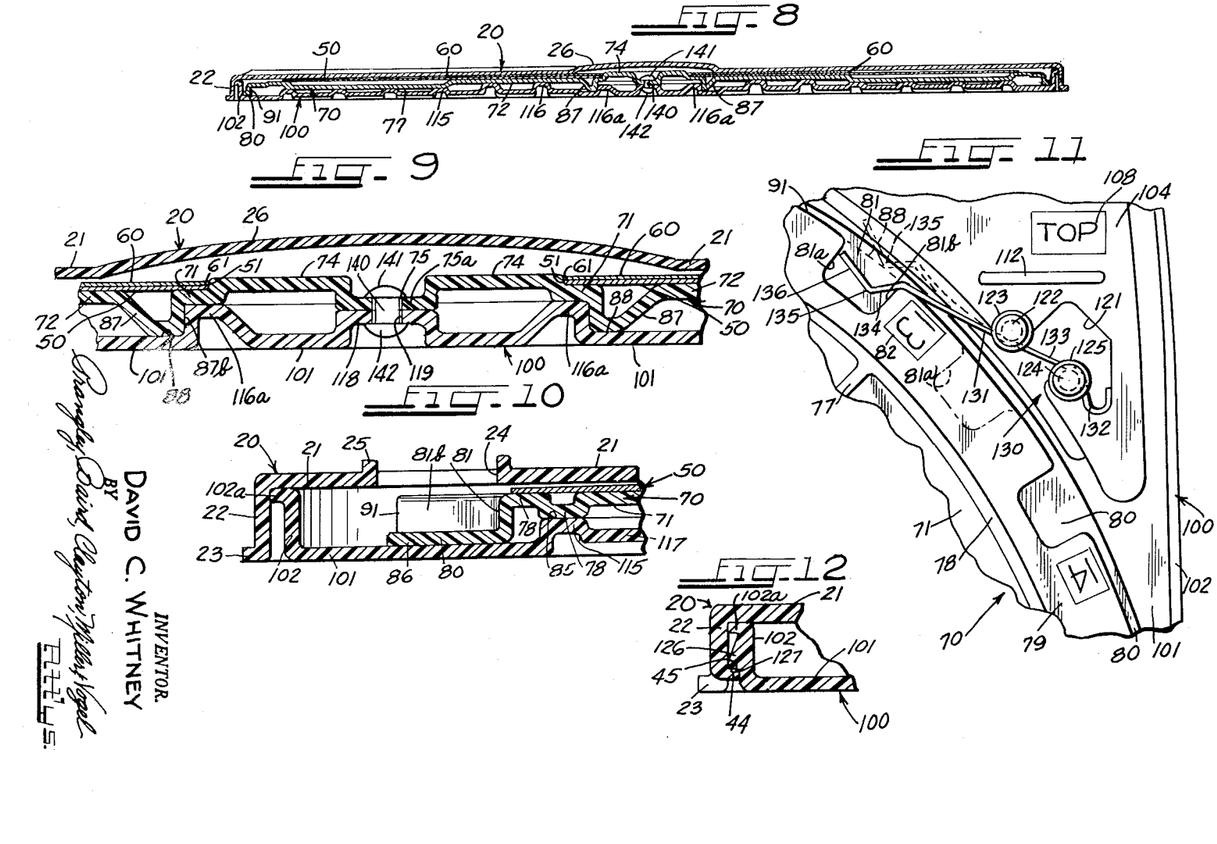
FIG. 8 is an enlarged view in vertical section along the line 8—8 of FIG. 1.
FIG. 9 is a fragmentary view on an enlarged scale in vertical section along the line 9—9 of FIG. 2 and illustrating the structure for rotatably mounting the support wheel upon the base.
FIG. 10 is a fragmentary view on an enlarged scale in vertical section along the line 10—10 of FIG. 2 and illustrating the mechanism for rotating the support wheel upon the base.
FIG. 11 is a fragmentary plan view of one corner of the teaching device on an enlarged scale with the cover broken away and illustrating the engagement of the detent spring with the pockets upon the support wheel which permit rotation of the support wheel with respect to the base in one direction only.
FIG. 12 is a fragmentary view on an enlarged scale in vertical section along the line 12—12 of FIG. 1 and illustrating the structure releasably interconnecting the cover and the base.

Referring to FIGS. 1 and 8 of the drawings, there is shown therein a teaching device generally designated by the numeral 10 made in accordance with and embodying the principles of the present invention, the teaching device 10 including a cover 20 overlying a test sheet 50 carrying a work sheet 60 and both supported by a support wheel 70 rotatably mounted upon a base 100. The cover 20 and the cooperating base 100 are substantially square in shape and in a typical illustrative example measure approximately 16½" on a side and have relatively shallow depth of slightly less than ½" when assembled, all of the windows and operating parts in the cover 20 being disposed to the left so as to be more readily accessible during use.

Figure 2:
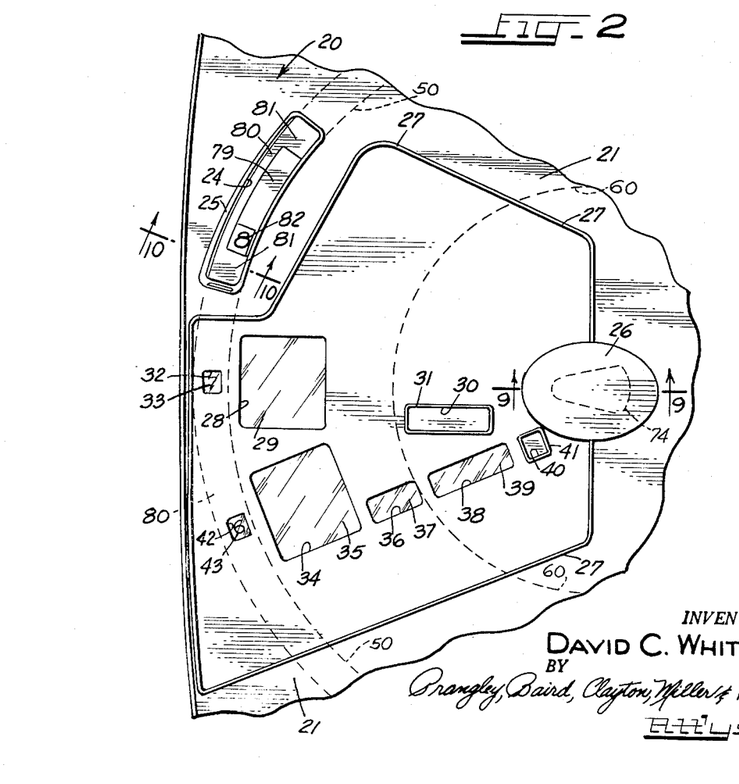
FIG. 2 is an enlarged fragmentary plan view of that portion of the teaching device including the windows through which the questions and answers and answer spaces and scoring spaces can be viewed and including the mechanism for successively presenting the various questions and answers to view.
Figure 3:
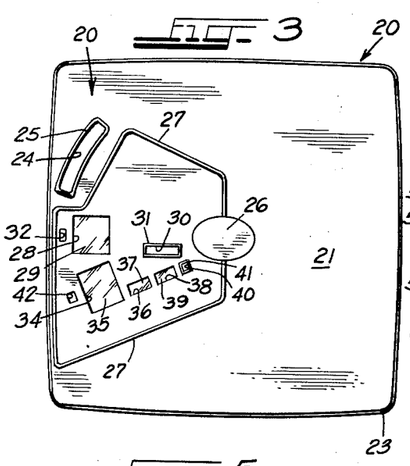
FIG. 3 is a plan view of the cover forming a part of the teaching device of FIG. 1.

The details of construction of the cover 20 are best seen in FIGS. 2 and 3 of the drawings wherein it will be seen that the cover 20 includes substantially a square body 21 provided with a downturned flange 22 extending completely around the periphery thereof and carrying on the lower edge an outturned flange 23 extending completely around the periphery thereof. Disposed in the upper left hand area of the cover 20, as viewed in FIG. 3, is a part-circular slot 24 which is adapted to overlie the periphery of the underlying support wheel 70 in order to permit the user to grasp portions of the support wheel 70 to cause rotation of the support wheel 70 with respect to the cover 20 as will be described more fully hereinafter, the perimeter of the slot 24 having an upstanding rim 25 extending therearound. The center of the body 21 has formed thereon an upstanding elliptical embossment 26 which covers the axis of rotation of the underlying support wheel 70 and joining the embossment 26 and extending around a plurality of windows on the cover 20 is an upstanding reinforcing rim 27. Disposed within the area bounded by the rim 27 is a first window 28 which is substantially square in shape and in a typical embodiment of the invention each edge thereof has a length of 1¾", the window 28 being adapted to overlie a new question to be answered on the test sheet 50 as will be described more fully hereinafter. In order to prevent the student from marking the underlying test sheet 50, a transparent pane 29 has been provided completely covering and overlying the window 28. Disposed adjacent to the window 28 and in general radial alignment therewith with respect to the center of the elliptical embossment 26 is an answer window 30 having an upstanding reinforcing rim 31 therearound, the window 30 being substantially rectangular and in typical operating embodiment having a length of 1¾" and a width of ½", the window 30 overlying an appropriate answer space on the associated work sheet 60 as will be described more fully hereinafter. Also disposed in radial alignment with the question window but disposed radially outwardly with respect thereto is a question number window 32 which may be substantially square in shape and in a typical construction each edge thereof will have a length of ⅜", the window 32 being provided with a transparent pane 33 and overlying the periphery of the support wheel 70 disposed therebelow which carries question numbers thereon as will be explained more fully hereinafter.

A second radial row of windows is provided in the cover 20 and disposed in a counterclockwise direction away from the windows 28 and 30. More specifically, a window 34 is disposed counterclockwise with respect to the window 28 and is adapted to be disposed above the previous question on the test sheet 50 disposed therebelow. The shape of the window 34 is square and the dimensions thereof are the same as the dimensions of the window 28, a transparent pane 35 being provided therefor and in overlying relationship therewith to prevent the user from marking the test sheet 50 lying thereunder. Disposed radially inwardly with respect to the window 34 is another window 36 which is adapted to overlie and register with the correct answer for the question displayed in the window 34 and disposed upon the underlying test sheet 50, the window 36 being rectangular in shape and in a specific exemplary device having a length of 1⅛" and a width of ½" and provided with a covering transparent pane 37. Another window 38 is disposed in radial alignment with the windows 34 and 36 and is adapted to overlie the answer to the question displayed through the window 34 which the user has written on the underlying work sheet 60. The window 38 is rectangular in shape and has dimensions substantially equal to those of the window 30 and further is provided with a transparent pane 39 overlying and covering the answer on the work sheet 60. Yet another window 40 is disposed in radial alignment with the windows 34 and 36 and 38 and is substantially square in shape and has dimensions of approximately ½" on each side and further is provided with an upstanding reinforcing rim 41 therearound, the window 40 being adapted to register with a scoring space on the underlying work sheet 60 so that the user can score himself by comparing the correct answer displayed through the window 36 with the answer which he has written in the answer space displayed in the window 38. A second question number window 42 is provided that is shaped like the question number window 32 but is disposed counterclockwise with respect thereto and in general radial alignment with the window 34 and is provided with a covering transparent pane 43, the window 42 being adapted to register with a question number on the periphery of the support wheel 70 corresponding to the question displayed through the window 34.

Figure 4:
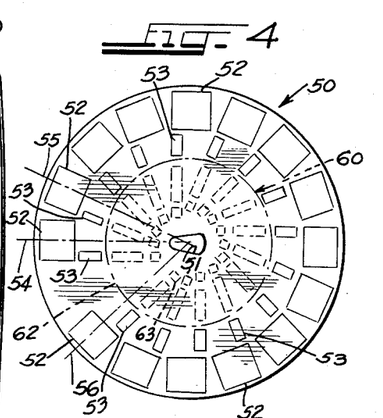
FIG. 4 is a plan view of a test sheet useful in the teaching device of FIG. 1 and showing thereon in dashed lines a work sheet to be used in association therewith.

The construction of the test sheet 50 and the association thereof with the work sheet 60 is best seen in FIGS. 4 and 8 of the drawings, wherein it will be seen that the test sheet 50 is a substantially flat member circular in shape and having a diameter such that it can fit within the periphery of the cover 20. Formed in the center of the test sheet 50 is an opening 51 which is asymmetric in shape and which is generally teardrop shaped, the opening 51 being shaped complementary to a key provided on the support wheel 70 as will be explained more fully hereinafter. Disposed about the test sheet 50 adjacent to the periphery thereof and arranged in a first circular path is a series of question spaces 52 which receive questions therein, the question spaces 52 being spaced apart substantially equiangularly around the test sheet 50 with the center lines thereof disposed 22½° apart as illustrated in FIG. 4. Disposed concentrically with the question spaces 52 is a plurality of correct answer spaces 53 arranged in a second circular path disposed radially inwardly with respect to the first circular path, the spaces 53 being spaced apart substantially equiangularly a distance of 22½°, the correct answer for each of the questions being in substantial radial alignment therewith. Fifteen question spaces 52 and fifteen answer spaces 53 have been illustrated around the periphery of the test sheet 50, the first question space 52 being disposed along a radius illustrated in dashed lines extending horizontally to the left and designated by the numeral 54, the second answer space 52, going in the counterclockwise direction, lying on a radius illustrated in dashed lines and designated by the numeral 55, etc., the 15th question space 52 having the center thereof disposed in alignment with a radius illustrated in dashed lines and designated by the numeral 56. While there are 22½° between the radii 54 and 55, there are 45° between the radii 54 and 56 whereby to provide a blank space between the first and 15th question spaces 52 and between the first and 15th correct answer spaces 53 for a purpose which will be described more fully hereinafter. The reverse side of the test sheet 50 preferably also carries questions and answers arranged in an identical manner with respect to the opening 51.

Figure 5:
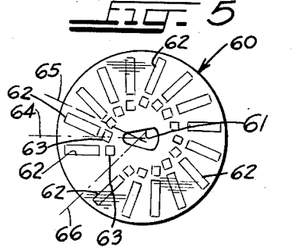
FIG. 5 is a plan view of a work sheet used in the teaching device of FIG. 1.
Figure 6:
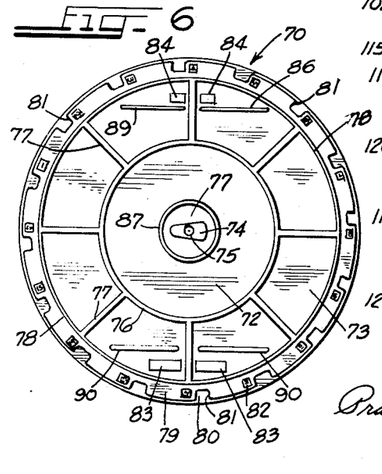
FIG. 6 is a plan view of the support wheel forming a part of the teaching device.

While it is possible to use the blank area on the test sheet 50 disposed inwardly with respect to the answer spaces 53, it is preferred to provide the work sheet 60 so that the test sheet 50 may be reused a substantial number of times. The construction of a work sheet 60 is illustrated in FIGS. 5 and 8 of the drawings, wherein it will be seen that the work sheet 60 comprises a substantially flat circular member having a diameter such that the work sheet 60 can lie within the area bounded by the inner edges of the correct answer spaces 53, see FIG. 4, the work sheet 60 having an opening 61 in the center thereof which is asymmetric and teardrop shaped like the opening 51 in the test sheet 50 for the reception therethrough of a key on the support wheel 70 as will be described more fully hereinafter. Arranged around the periphery of the work sheet 60 is a first series of answer spaces 62 which are generally rectangular in shape and have substantially the same dimensions as the window 30 in the cover 20 and are adapted to be in registration therewith to receive therein the student's written answer to the question displayed in the window 28. Concentric with the answer spaces 62 is a group of scoring spaces 63 arranged in a second circular path around the center of the work sheet 60, the scoring spaces 63 having a substantially square shape and a size corresponding to a size of the scoring window 40 of the cover 20 so that the student can mark his answer displayed in the window 38 either correct or incorrect after comparing it with the correct answer displayed through the window 36. The first set of spaces 62 and 63 is disposed substantially parallel to the radius of the work sheet 60 extending horizontally to the left in dashed lines and designated by the numeral 64. The second set of spaces 62 and 63 is disposed substantially parallel to a second radius of the work sheet 60 illustrated in dashed lines and designated by the numeral 65 and disposed 22½° in a clockwise direction from the radius 64. Successive sets of the spaces 62 and 63 are likewise arranged in equiangularly spaced-apart relationship about the work sheet 60, 15 sets of the answer spaces 62 being provided with the 15th set being disposed parallel to a radius illustrated in dashed lines and designated by the numeral 66 and disposed counterclockwise with respect to the radius 64, whereby to provide a blank space between the radius 64 and 66 for a purpose which will be described more fully hereinafter. As is best illustrated in FIG. 4 of the drawings, the test sheet 50 and the work sheet 60 are disposed concentrically with the radii 54 and 64 in radial alignment, with the radii 55 and 65 in radial alignment, etc., and with the radii 56 and 66 in radial alignment. With the sheets 50 and 60 arranged in this manner, the openings 51 and 61 therein will correspond.

The construction of the support wheel 70 can be best seen from FIGS. 6, 8, 9, 10 and 11 of the drawings, wherein it will be seen that the support wheel 70 is generally circular in shape and has a diameter such that it can lie within the periphery of the cover 20 in the associated base 100, a typical construction of the wheel 70 having a diameter of 16″ and including a hub portion 71 disposed centrally thereof, a substantially flat annular work sheet supporting portion 72 disposed about the hub portion 71 and an annular outer portion 73 disposed about the work sheet supporting portion 72. The hub portion 71 includes an upstanding key 74 that is asymmetric and teardrop in shape and having the same shape as the openings 51 and 61 in the sheets 50 and 60, respectively, described above and adapted to be received therein. Disposed in the center of the key 74 is a depression 75a having an opening 75 therein to receive a rivet 140 therethrough for a purpose to be described more fully hereinafter. Joining the hub portion 71 and the portion 72 is a downwardly directed reinforcing and bearing rib 87 having a bearing surface 88 on the underside thereof and adapted to bear against the upper surface of the base 100, the rib 87 being annular in shape and integrally connecting the portions 71 and 72. Integrally connecting the portions 72 and 73 is a downwardly extending reinforcing rib 76, the portion 73 also carrying radially extending reinforcing ribs 77 and having along the outer periphery thereof an integral reinforcing rib 78 connecting with an annular peripheral surface 79 connected to a lower annular flange 80 by an interconnecting flange 91 (see FIG. 10 particularly). Provided in the surface 79 is a plurality of pockets 81, there being 16 pockets about the periphery of the support wheel 70 spaced apart equiangularly 22½° with a pocket 81 corresponding to each of the question spaces 52 on the test sheet 50 plus a pocket corresponding to the blank space between the radii 54 and 56 thereof, each of the pockets 81 being successively accessible through the slot 24 in the cover 20 as the support wheel 70 is rotated with respect thereto. Also formed in the surface 79 is a plurality of depressions 82 equal in number to the pockets 81 and offset circumferentially in a clockwise direction with respect thereto and each carrying a suitable identifying indicia, the depression 82 disposed horizontally to the left in FIG. 6 being provided with the numeral 1 and succeeding depressions 82 being provided with the numerals 2 through 15, the depression 82 disposed counterclockwise with respect to the numeral 1 carrying the indicia "END." There further is provided a pair of horizontally disposed depressions 83 adjacent to the bottom of the support wheel 70 as viewed in FIG. 6 and adapted to receive therein indicia reading "BOTTOM" and a second pair of horizontally arranged depressions 84 disposed at the top of the support wheel 70 as viewed in FIG. 6 and having therein indicia and reading "TOP." There further are provided horizontal indicating ribs 89 near the top of the support wheel 70 as viewed in FIG. 6 and indicating ribs 90 disposed parallel to the ribs 89 near the bottom of the support wheel 70 as viewed in FIG. 6, the ribs 89 and 90 forming and indicating an alignment function with like ribs on the base 100 as will be described more fully hereinafter.

Referring to FIGS. 7 through 12 of the drawings, the construction of the base 100 will be described in detail wherein it will be seen that the base 100 includes a bottom panel 101 having an outline complementary to that of the cover 20 and being substantially square in shape and having an upturned flange 102 around the periphery thereof having dimensions such that the support wheel 70 can be received therein. Formed in the corners of the base 100 and extending upwardly therefrom are reinforcing and guiding embossments 103, 104, 105 and 106 which have generally circular inner surfaces disposed toward the center of the base 100 and adapted to lie along the outer periphery of the flange 80 on the support wheel 70. Each of the embossments 103, 104, 105 and 106 has thereon depressions 107, 108, 109 and 110, respectively, which carry suitable indicia therein, the depressions 107 and 108 carrying the notation "TOP" and the depressions 109 and 110 carrying the indicia "BOTTOM." Each of the embossments 103, 104, 105 and 106 further carries parallel indicating ribs 111, 112, 113 and 114, respectively, the ribs 111 and 112 being adapted to be in alignment with the ribs 89 on the support wheel 70 and the ribs 113 and 114 being adapted to be in alignment with the ribs 90 of the support wheel 70 when the parts are in position to receive a new test sheet 50 and work sheet 60 thereon. Formed on the bottom panel 101 is a series of concentric upwardly extending circular reinforcing ribs 115, there being four of the ribs 115, and two concentric broader and higher reinforcing ribs 116 disposed near the center thereof. Radially extending reinforcing ribs 117 interconnecting the ribs 115 and 116 are also provided, there being eight of the reinforcing ribs 117 disposed substantially equiangularly about the base 100. Disposed centrally of the base 100 is an upstanding embossment 118 which is substantially flat on the upper surface thereof and is provided in the center thereof with an opening 119 therethrough to receive the rivet 140, the upper surface of the embossment 118 being adapted to receive and bear against the under surface of the embossment 75a of the support wheel 70 with the openings 119 and 75 being in alignment and receiving therethrough the rivet 140 which has the ends thereof upset to form overlying retaining flanges 141 and 142 disposed permanently to interconnect the support wheel 70 and the underlying base 100. Disposed about the embossment 118 is an annular upstanding reinforcing rib 116a having an outer surface 116b disposed perpendicular to the bottom panel 101 and adapted to bear against an inner surface 87b on the reinforcing rib 87 of the support wheel 70 so as to center the support wheel 70 upon the base 100.

Figure 7:
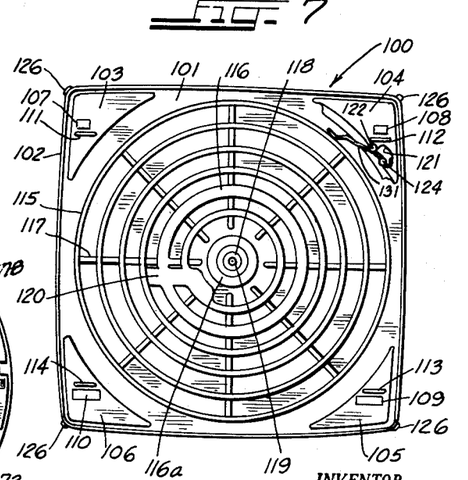
FIG. 7 is a plan view of the base of the teaching device.

In order to provide a solid surface upon which the student may write his answer through the window 30, the base 100 is provided with a writing surface 120 which can be best seen in FIG. 7 of the drawings, the surface 120 being disposed substantially horizontally as viewed therein and interconnecting the reinforcing ribs 116, the surface 120 being adapted to be disposed beneath the window 30 in the cover 20 when the cover 20 is assembled upon the base 100.

A detent mechanism generally designated by the numeral 130 is provided to permit rotation of the support wheel 70 only in a counterclockwise direction and positively to prevent rotation thereof in a clockwise direction.

The detent mechanism 130 includes a spring 131 which is anchored upon the base 100 in a recess 121 provided in the embossment 104, there also being mounted in the embossment 104 a first rivet 122 holding a retaining washer 123 against the surface of the embossment 104 and a second rivet 124 holding a second retaining washer 125 against the upper surface of the embossment 104. The spring 131 includes an anchor portion 132 disposed in the recess 121 and a mounting portion 133 integral with the anchor portion 132 and held in position by the retaining washers 123 and 125 on the base 100. The outer end of the spring 131 carries a pawl including a cam surface 134 adapted to engage the wall 81b of an adjacent pocket 81 and an abutment end 136 adapted to engage the opposite wall 81a of an associated pocket 81. Rotation of the support wheel 70 in a counterclockwise direction is possible since the wall 81b will ride along the cam surface 134 toward the junction 135 thereof with the abutment end 136 so as to place the junction 135 on the vertical wall 91 of the support wheel 70 thereby permitting rotation thereof until the pawl drops into the next pocket 81 to index the support wheel 70 with respect to the cover 20, the position of the spring when the junction 135 is on the wall 91 being illustrated by dashed lines in FIG. 11. Rotation of the support wheel 70 in the counterclockwise direction with respect to the base 100 is prevented by the abutment end 136 engaging the wall 81a of the associated pocket 81 whereby positively to prevent movement of the support wheel 70 in this direction.

Means is provided to interconnect the cover 20 and the base 100 to hold the cover 20 in the proper assembled relationship with respect thereto, the structure being best illustrated in FIGS. 7 and 12 of the drawings. Provided on each of the corners of the base 100 is an outwardly directed cam 126 having a generally horizontally disposed retaining surface 127 thereon. Formed on each corner of the cover 20 is an integral inwardly directed latch 44 having an engaging surface 45 thereon adapted to be disposed beneath the retaining surface 127 on the cam 126. In assembling the cover 20 on the base 100, the latches 44 are moved downwardly past the flanges 102a and then across the surfaces of the cams 126 which force the latches 44 outwardly until they can snap beneath the retaining surfaces 127 with the engaging surface 45 in engagement therewith. With the parts thus positioned the cover 20 is secured upon the base 100. The surfaces 145 and 127 however are releasably engaged and can be moved apart by supplying sufficient force intending to move the cover 20 away from the base 100, this movement being facilitated by the material of construction of the cover 20 and the base 100.

The cover 20 and the support wheel 70 and the base 100 are preferably formed of a lightweight and resilient, yet strong material, a preferred material of construction being a synthetic organic plastic resin, the preferred resin being high impact polystyrene. The various panes 29, 31, 33, 35, 37, 39, 41 and 43 are formed of a transparent synthetic organic plastic resin, it being understood that a single sheet of resin suitably attached to the underside of the cover 20 may serve to provide all of the panes for the various windows. The test sheet 50 and the work sheet 60 are formed of paper or cardboard and have the various spaces and the questions and answers thereon applied thereto by printing although the questions and answers can also be applied thereto by pasting separate pieces of paper or cardboard thereon. The other parts of the teaching device 10 are preferably formed of metal such as steel with the exception of the spring 131 which is preferably made of a resilient metal such as a copper-beryllium alloy.

The teaching device 10 is normally used with the parts oriented as illustrated in FIGS. 2 and 3 of the drawings and in using the teaching device 10, the student first removes the cover 20 to expose the support wheel 70 in operative position upon the base 100, the base 100 being oriented as illustrated in FIG. 7 of the drawings with the notations "BOTTOM" in the depressions 109 and 110 being disposed toward the student. The support wheel 70 is then rotated until the notation "BOTTOM" in the depressions 83 is disposed toward the student and the indicating ribs 90 on the support wheel 70 are in horizontal alignment with the indicating ribs 113 and 114 on the base 100, it being noted that such movement of the support wheel 70 will simultaneously place the indicating ribs 89 near the top of the support wheel 70 in alignment with the indicating ribs 111 and 112 near the top of the base 100. This orientation of the support wheel 70 will also simultaneously place the key 74 with the longer dimension thereof disposed horizontally and will place the question number 1 directly horizontally to the left of the key 74 along a radius of the support wheel 70.

The student then places the test sheet 50 upon the support wheel 70 by moving the opening 51 into alignment with the key 74 which permits the test sheet 50 then to fall upon the support surfaces 72 and 73, thus placing the first question in alignment with the numbered depression on the support wheel 70 carrying the number 1. Then the work sheet 60 is placed upon the test sheet 50, the opening 61 being oriented to receive the key 74 therethrough, whereby to place the answer space 62 and the corresponding scoring space 63 parallel to the radius 64 in general radial alignment with the first question in the question space 52 and the correct answer therefor in the answer space 53, each of the other answer spaces and scoring spaces being properly aligned with the corresponding question and answer on the test sheet 50.

The cover 20 is then mounted upon the base 100 by engaging the latches 44 with the cams 126 (see FIG. 12), care being taken to place all of the windows to the left as illustrated in FIG. 3 of the drawings. With the cover 20 assembled upon the base 100, it will be found that question number 1 on the test sheet 50 will be in registration with the window 28, the depression 82 carrying the number 1 will be in registration with the window 32, and the first answer space 62 on the work sheet 60 will be in alignment with the window 30. There will be no material seen through the windows 34, 36, 38 and 40 since these windows will be in alignment with the blank portions of the test sheet 50 and the work sheet 60. The depression 82 on the support wheel 70 carrying the notation "END" will be seen through the window 42. There also will be seen through the slot 24 an appropriate one of the pockets 81 which will be used later in rotating the support wheel 70 with respect to the cover 20.

The student reads the question seen through the window 28 and writes his answer thereto through the window 30 within the first answer space 62 on the work sheet 60. He then places a finger in the pocket 81 seen in the upper portion of the slot 24 and rotates the support wheel 70 in a counterclockwise direction by moving his finger downwardly within the slot 24, this movement of the support wheel 70 being permitted since the cam surface 134 is engaged by the wall of the associated pocket 81 and moves the point 135 of the spring 131 onto the outer peripheral surface 91 of the support wheel 70; rotation in the opposite direction is prevented by the abutment end 136 on the spring 131 as has been explained heretofore; the cam surface 134 and the abutment end 136 in the spring 131 fall into the next pocket 81 disposed clockwise with respect thereto thus indexing the support wheel 70 in a proper position. With the parts in this new position, question number 2 will be viewed through the window 28 and the depression 82 carrying the number 2 will be seen through the window 32. The first question in the question space 52 on the test sheet 50 will now be seen through the window 34 and the appropriate number therefor on the periphery of the support wheel 70 will be seen through the window 42. The correct answer for question number 1 disposed in the answer space 53 on the test sheet 50 will now be seen by the student for the first time through the answer window 36 and the student's written answer to question number 1 disposed in the first answer space 62 on the work sheet 60 will simultaneously be displayed through the window 38. Accordingly, the student can simultaneously view question numer 1 with the correct answer to question number 1 and the student's written answer to question number 1 through the windows 34, 36, and 38, respectively, and after comparing his written answer with the correct answer, the student through the window 40 can mark his answer correct with a "C" or incorrect with an "X" in the first scoring space 63 on the work sheet 60. It will be noted that during the scoring operation, the student does not have access to his written answer in the window 38 since the pane 39 is provided therein and covers his answer, and likewise question number 1 and the correct answer to question number 1 are covered by the transparent panes 35 and 37, respectively, and the second question displayed through the window 28 is similarly covered by the transparent pane 29.

After having scored his first answer through the window 40 in the scoring space 63 on the work sheet 60, the student then turns to the second question which is now displayed through the window 28, the number 2 upon the support wheel 70 now being seen through the window 32. Having read the question, the student then writes his answer through the window 30 in the second answer space 62 on the work sheet 60, it being noted that the support surface 120 on the base 100 underlies and supports the work sheet supporting portion 72 of the support wheel 70 which in turn underlies the work sheet 60. Having answered the second question, the student again inserts his finger in the slot 24 and engages the pocket 81 in the upper portion thereof and rotates the support wheel 70 to the next position, the spring 131 again serving to permit rotation in only the counterclockwise direction and also serving properly to register the parts such that the proper portions of the test sheet 50 and the work sheet 60 are in registration with the various windows. This process is repeated until each of the fifteen questions on the test sheet 50 have been answered by the student writing his answer through the window 30 in the appropriate answer space 62 on the work sheet 60 and until each of the answers written in the answer spaces 62 has been scored by placing the proper symbol through the window 40 in the appropriate scoring space 63 on the work sheet 60. It will be noted that when the 15th question is in registration with the window 34, a blank space will be presented beneath the windows 28 and 30 and the notation "END" on the periphery of the support wheel 70 will be seen through the window 32. This arrangement of the parts will notify the student to remove the cover 20 of the base 100 by forcing the latches 44 on the cover 20 over the cams 126 on the base 100. The student can now remove his work sheet 60 and count the number of correct and incorrect answers that he has given to the questions on the test sheet 50. Suitable instructions can be provided indicating that if a certain number of questions were incorrectly answered, the student shall repeat the process utilizing the same test sheet 50. It will be understood that a plurality of test sheets 50 may be devoted to a single subject matter. Furthermore, a large number of subjects matter can be conveniently taught utilizing the teaching device 10 of the present invention. A corresponding plurality of the work sheets 60 is also provided so that each of the work sheets 60 is preferably utilized only once by the student.

It will be seen that there has been provided a teaching device 10 which fulfills all of the objects and advantages set forth above. While there has been described what at present appears to be the preferred embodiment of the invention, it will be understood that various changes and modifications can be made therein without departing from the spirit and scope thereof, and it is intended to cover in the appended claims all such changes and modifications which fall within the scope of the present invention.

What is claimed is:

1. A teaching device comprising a base, a support wheel mounted on said base for rotation about an axis with respect thereto, a test sheet mounted on said support wheel for rotation therewith about said axis and having thereon a plurality of questions arranged in a first circular path about said axis and a corresponding plurality of answers arranged in a second circular path about said axis, a work sheet mounted on said support wheel for rotation therewith about said axis and having thereon a plurality of answer spaces arranged in a third circular path about said axis and a corresponding plurality of scoring spaces arranged in a fourth circular path about said axis, the number of said answer spaces and said scoring spaces corresponding to the number of said questions on said test sheet, a cover mounted on said base and covering said support wheel and said test sheet and said work sheet, a first window in said cover and overlying said first circular path for displaying a question to be answered therethrough, a second window in said cover and overlying said third circular path for displaying an answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough the answer on said work sheet corresponding to the question displayed through said third window, a sixth window in said cover and overlying said fourth circular path for displaying therethrough the scoring space corresponding to the question displayed through said third window, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window and the corresponding scoring space on said work sheet through said sixth window.

2. A teaching device comprising a base, a support wheel mounted on said base for rotation about an axis with respect thereto, a test sheet mounted on said support wheel for rotation therewith about said axis and having thereon a plurality of questions arranged in a first circular path about said axis and a corresponding plurality of answers arranged in a second circular path about said axis, a work sheet mounted on said support wheel for rotation therewith about said axis and having thereon a plurality of answer spaces arranged in a third circular path about said axis and a corresponding plurality of scoring spaces arranged in a fourth circular path about said axis, the number of said answer spaces and said scoring spaces corresponding to the number of said questions on said test sheet, a cover mounted on said base and covering said support wheel and said test sheet and said work sheet, a first window in said cover and overlying said first circular path for displaying a question to be answered therethrough, a second window in said cover and overlying said third circular path for displaying an answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough the answer on said work sheet corresponding to the question displayed through said third window, a sixth window in said cover and overlying said fourth circular path for displaying therethrough the scoring space corresponding to the question displayed through said third window, transparent panes overlying said first and third and fourth and fifth windows for preventing access to the material thereunder while permitting viewing thereof therethrough, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window and the corresponding scoring space on said work sheet through said sixth window.

3. A teaching device comprising a base, a support wheel mounted on said base for rotation about an axis with respect thereto, a test sheet mounted on said support wheel for rotation therewith about said axis and having thereon a plurality of questions arranged in a first circular path about said axis and a corresponding plurality of answers arranged in a second circular path about said axis, a work sheet mounted on said support wheel for rotation therewith about said axis and disposed within said second circular path and having thereon a plurality of answer spaces arranged in a third circular path about said axis and a corresponding plurality of scoring spaces arranged in a fourth circular path about said axis, the number of said answer spaces and said scoring spaces corresponding to the number of said questions on said test sheet, a cover mounted on said base and covering said support wheel and said test sheet and said work sheet, a first window in said cover and overlying said first circular path for displaying a question to be answered therethrough, a second window in said cover and overlying said third circular path for displaying an answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough the answer on said work sheet corresponding to the question displayed through said third window, a sixth window in said cover and overlying said fourth circular path for displaying therethrough the scoring space corresponding to the question displayed through said third window, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window and the corresponding scoring space on said work sheet through said sixth window.

4. A teaching device comprising a base, a support wheel mounted on said base for rotation about an axis with respect thereto, a test sheet mounted on said support wheel for rotation therewith about said axis and having thereon a plurality of questions arranged in a first circular path about said axis and a corresponding plurality of answers arranged in a second circular path about said axis, a work sheet mounted on said support wheel for rotation therewith about said axis and having thereon a plurality of answer spaces arranged in a third circular path about said axis and a corresponding plurality of scoring spaces arranged in a fourth circular path about said axis, the number of said answer spaces and said scoring spaces corresponding to the number of said questions on said test sheet, a cover mounted on said base and covering said support wheel and said test sheet and said work sheet, a first window in said cover and overlying said first circular path for displaying a question to be answered therethrough, a second window in said cover and overlying said third circular path for displaying an answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough the answer on said work sheet corresponding to the question displayed through said third window, a sixth window in said cover and overlying said fourth circular path for displaying therethrough the scoring space corresponding to the question displayed through said third window, said first and second windows being in general radial alignment with respect to said axis and all of said third and fourth and fifth and sixth windows being in general radial alignment with each other about said axis, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window and the corresponding scoring space on said work sheet through said sixth window.

5. A teaching device comprising a base, a support wheel mounted on said base for rotation about an axis with respect thereto, a test sheet mounted on said support wheel for rotation therewith about said axis and having thereon a plurality of questions arranged in a first circular path about said axis and a corresponding plurality of answers arranged in a second circular path about said axis, each of said questions being in general radial alignment with respect to the corresponding answer about said axis, a work sheet mounted on said support wheel for rotation therewith about said axis and disposed within said second circular path and having thereon a plurality of answer spaces arranged in a third circular path about said axis and a corresponding plurality of scoring spaces arranged in a fourth circular path about said axis, each of said answer spaces being in general radial alignment with the corresponding scoring space about the said axis, the number of said answer spaces and said scoring spaces corresponding to the number of said questions on said test sheet, a cover mounted on said base and covering said support wheel and said test sheet and said work sheet, a first window in said cover and overlying said first circular path for displaying a question to be answered therethrough, a second window in said cover and overlying said third circular path for displaying an answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough the answer on said work sheet corresponding to the question displayed through said third window, a sixth window in said cover and overlying said fourth circular path for displaying therethrough the scoring space corresponding to the question displayed through said third window, said first and second windows being in general radial alignment with respect to said axis and all of said third and fourth and fifth and sixth windows being in general radial alignment with each other about the said axis, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window and the corresponding scoring space on said work sheet through said sixth window.

6. A teaching device comprising a base, a support wheel mounted on said base for rotation about an axis with respect thereto, a test sheet mounted on said support wheel for rotation therewith about said axis and having thereon a plurality of questions arranged in a first circular path about said axis and a corresponding plurality of answers arranged in a second circular path about said axis, a work sheet mounted on said support wheel for rotation therewith about said axis and having thereon a plurality of answer spaces arranged in a third circular path about said axis and a corresponding plurality of scoring spaces arranged in a fourth circular path about said axis, the number of said answer spaces and said scoring spaces corresponding to the number of said questions on said test sheet, a plurality of question numbers on said support wheel disposed outwardly with respect to the periphery of said test sheet and said work sheet and arranged in a fifth circular path about said axis, a cover mounted on said base and covering said support wheel and said test sheet and said work sheet, a first window in said cover and overlying said first circular path for displaying a question to be answered therethrough, a second window in said cover and overlying said third circular path for displaying an answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough, a sixth window in said cover and overlying said fourth circular path for displaying therethrough the scoring space corresponding to the question displayed through said third window, a seventh window in said cover and overlying said fifth circular path at a point in radial alignment with said first window for displaying therethrough the number of the question displayed through said first window, an eighth window in said cover and overlying said fifth circular path at a point disposed radially outwardly from said third window for displaying therethrough the question number on said support wheel corresponding to the question displayed through said third window, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window and the corresponding scoring space on said work sheet through said sixth window.

7. A teaching device for use with a test sheet having thereon a plurality of questions arranged in a first circular path and a corresponding plurality of answers arranged in a second circular path concentric with the first circular path and a work sheet having thereon a plurality of answer spaces arranged in a third circular path concentric with the first circular path and a corresponding plurality of scoring spaces arranged in a fourth circular path concentric with the first circular path, said teaching device comprising a base, a support wheel mounted on said base for rotation about an axis with respect thereto and including means for receiving and mounting an associated test sheet and work sheet with the circular paths thereon concentric with the axis of rotation thereof, a cover mounted on said base and covering said support wheel and the associated test sheet and work sheet mounted thereon, a first window in said cover adapted to overlie the first circular path on the associated test sheet for displaying a question to be answered therethrough, a second window in said cover adapted to overlie the third circular path on the associated work sheet for displaying an answer space therethrough, a third window in said cover and adapted to overlie the first circular path at a point circumferentially spaced with respect to said first window for displaying the preceding question therethrough, a fourth window in said cover and adapted to overlie the second path on the associated test sheet for displaying the answer corresponding to the question displayed through said third window, a fifth window in said cover and adapted to overlie the third circular path of the associated work sheet at a point disposed circumferentially from said second window for displaying therethrough the answer corresponding to the question displayed through said third window, a sixth window in said cover and adapted to overlie the fourth circular path of the associated work sheet for displaying therethrough the scoring space corresponding to the question displayed through said third window, and means for rotating said support wheel with the associated test sheet and work sheet thereon with respect to said cover and said windows therein, whereby successively to display a question to be answered on the associated test sheet through said first window and the corresponding answer space on the associated work sheet through said second window while simultaneously displaying the previous question through said third window and the corresponding answer through said fourth window and the corresponding answer space through said fifth window and the corresponding scoring space through said sixth window.

8. A teaching device for use with a test sheet and work sheet having thereon a plurality of questions arranged in a first circular path and a corresponding plurality of answer arranged in a second circular path concentric with the first circular path and a plurality of answer spaces arranged in a third circular path concentric with the first circular path, said teaching device comprising a support wheel mounted for rotation about an axis and including means for receiving and mounting an associated test sheet and work sheet with the circular paths thereon concentric with said axis, a cover mounted for covering said support wheel and the associated test sheet and work sheet mounted thereon, a first window in said cover adapted to overlie the first circular path for displaying a question to be answered therethrough, a second window in said cover adapted to overlie the third circular path for displaying an answer space therethrough, a third window in said cover and adapted to overlie the second path for displaying the answer corresponding to the question previously displayed through said first window, a fourth window in said cover and adapted to overlie the third circular path at a point disposed circumferentially from said second window for displaying therethrough the answer corresponding to the question previously displayed through said first window, and means for rotating said support wheel with the associated test sheet and work sheet thereon with respect to said cover and said windows therein, whereby successively to display a question to be answered through said first window and the corresponding answer space through said second window while simultaneously displaying the answer to the preceding question through said third window and the corresponding answer space through said fourth window.

9. A teaching device for use with a test sheet and work sheet having thereon a plurality of questions arranged in a first circular path and a corresponding plurality of answers arranged in a second circular path concentric with the first circular path and a plurality of answer spaces arranged in a third circular path concentric with the first circular path, said teaching device comprising a support wheel mounted for rotation about an axis and including means for receiving and mounting an associated test sheet and work sheet with the circular paths thereon concentric with said axis, a cover mounted for covering said support wheel and the associated test sheet and work sheet mounted thereon, a first window in said cover adapted to overlie the first circular path for displaying a question to be answered therethrough, a second window in said cover adapted to overlie the third circular path for displaying an answer space therethrough, a third window in said cover and adapted to overlie the first circular path at a point circumferentially spaced with respect to said first window for displaying the preceding question therethrough, a fourth window in said cover and adapted to overlie the second path for displaying the answer corresponding to the question displayed through said third window, a fifth window in said cover and adapted to overlie the third circular path at a point disposed circumferentially from said second window for displaying therethrough the answer corresponding to the question displayed through said third window, and means for rotating said support wheel with the associated test sheet and work sheet thereon with respect to said cover and said windows therein, whereby successively to display a question to be answered through said first window and the corresponding answer space through said second window while simultaneously displaying the previous question through said third window and the corresponding answer through said fourth window and the corresponding answer space through said fifth window.

10. A teaching device for use with a test sheet and work sheet having thereon a plurality of questions arranged in a first circular path and a corresponding plurality of answers arranged in a second circular path concentric with the first circular path and a plurality of answer spaces arranged in a third circular path concentric with the first circular path and a corresponding plurality of scoring spaces arranged in a fourth circular path concentric with the first circular path, said teaching device comprising a support wheel mounted for rotation about an axis and including means for receiving and mounting an associated test sheet and work sheet with the circular paths thereon concentric with said axis, a cover mounted for covering said support wheel and the associated test sheet and work sheet mounted thereon, a first window in said cover adapted to overlie the first circular path for displaying a question to be answered therethrough, a second window in said cover adapted to overlie the third circular path for displaying an answer space therethrough, a third window in said cover and adapted to overlie the first circular path at a point circumferentially spaced with respect to said first window for displacing the preceding question therethrough, a fourth window in said cover and adapted to overlie the second path for displaying the answer corresponding to the question displayed through said third window, a fifth window in said cover and adapted to overlie the third circular path at a point disposed circumferentially from said second window for displaying therethrough the answer corresponding to the question displayed through said first window, a sixth window in said cover and adapted to overlie the fourth circular path for displaying therethrough the scoring space corresponding to the question displayed through said third window, and means for rotating said support wheel with the associated test sheet and work sheet thereon with respect to said cover and said windows therein, whereby successively to display a question to be answered through said first window and the corresponding answer space through said second window while simultaneously displaying the previous question through said third window and the corresponding answer through said fourth window and the corresponding answer space through said fifth window and the corresponding scoring space through said sixth window.

11. A teaching device for use with a test sheet and work sheet having thereon a plurality of questions arranged in a first circular path and a corresponding plurality of answers arranged in a second circular path concentric with the first circular path and a plurality of answer spaces arranged in a third circular path concentric with the first circular path and a corresponding plurality of scoring spaces arranged in a fourth circular path concentric with the first circular path, said teaching device comprising a support wheel mounted for rotation about an axis and including means for receiving and mounting an associated test sheet and work sheet with the circular paths thereon concentric with said axis, a cover mounted for covering said support wheel and the associated test sheet and work sheet mounted thereon, a first window in said cover adapted to overlie the first circular path for displaying a question to be answered therethrough, a second window in said cover adapted to overlie the third circular path for displaying an answer space therethrough, a third window in said cover and adapted to overlie the first circular path at a point circumferentially spaced with respect to said first window for displaying the preceding question therethrough, a fourth window in said cover and adapted to overlie the second path for displaying the answer corresponding to the question displayed through said third window, a fifth window in said cover and adapted to overlie the third circular path at a point disposed circumferentially from said second window for displaying therethrough the answer corresponding to the question displayed through said third window, a sixth window in said cover and adapted to overlie the fourth circular path for displaying therethrough the scoring space corresponding to the question displayed through said third window, said first and second windows being in general radial alignment with respect to said axis and all of said third and fourth and fifth and sixth windows being in general radial alignment with each other about said axis, and means for rotating said support wheel with the associated test sheet and work sheet thereon with respect to said cover and said windows therein, whereby successively to display a question to be answered through said first window and the corresponding answer space through said second window while simultaneously displaying the previous question through said third window and the corresponding answer through said fourth window and the corresponding answer space through said fifth window and the corresponding scoring space through said sixth window.

12. A teaching device for use with a test sheet and work sheet having thereon a plurality of questions arranged in a first circular path and a corresponding plurality of answers arranged in a second circular path concentric with the first circular path and a plurality of answer spaces arranged in a third circular path concentric with the first circular path, said teaching device comprising a base, a support wheel mounted on said base for rotation about an axis with respect thereto and including means for receiving and mounting an associated test sheet and work sheet with the circular paths thereon concentric with said axis, a plurality of pockets on the periphery of said support wheel, a cover mounted on said base and covering said support wheel and the associated test sheet and work sheet mounted thereon, a first window in said cover adapted to overlie the first circular path for displaying a question to be answered therethrough, a second window in said cover adapted to overlie the third circular path for displaying an answer space therethrough, a third window in said cover and adapted to overlie the second path for displaying the answer corresponding to the question previously displayed through said first window, a fourth window in said cover and adapted to overlie the third circular path at a point disposed circumferentially from said second window for displaying therethrough the answer corresponding to the question previously displayed through said first window, said cover having a slot therein overlying the path of movement of said pockets so that the user can engage the pockets through said slot for rotating said support wheel with a test sheet and a work sheet thereon with respect to said cover and said windows therein, whereby successively to display a question to be answered through said first window and the corresponding answer space through said second window while simultaneously displaying the answer to the preceding question through said third window and the corresponding answer space through said fourth window.

13. A teaching device for use with a test sheet and work sheet having thereon a plurality of questions arranged in a first circular path and a corresponding plurality of answers arranged in a second circular path concentric with the first circular path and a plurality of answer spaces arranged in a third circular path concentric with the first circular path, said teaching device comprising a base, a support wheel mounted on said base for rotation about an axis with respect thereto and including means for receiving and mounting an associated test sheet and work sheet with the circular paths thereon concentric with said axis, a plurality of pockets on the periphery of said support wheel, a cover mounted on said base and covering said support wheel and the associated test sheet and work sheet mounted thereon, a first window in said cover adapted to overlie the first circular path for displaying a question to be answered therethrough, a second window in said cover adapted to overlie the third circular path for displaying an answer space therethrough, a third window in said cover and adapted to overlie the second path for displaying the answer corresponding to the question previously displayed through said first window, a fourth window in said cover and adapted to overlie the third circular path at a point disposed circumferentially from said second window for displaying therethrough the answer corresponding to the question previously displayed through said first window, said cover having a slot therein overlying the path of movement of said pockets so that the user can engage the pockets through said slot for rotating said support wheel with a test sheet and a work sheet thereon with respect to said cover and said windows therein, and means permitting rotation of said support wheel with respect to said base in one direction only, whereby successively to display a question to be answered through said first window and the corresponding answer space through said second window while simultaneously displaying the answer to the preceding question through said third window and the corresponding answer space through said fourth window.

14. A teaching device comprising a support wheel mounted for rotation about an axis, a test sheet and work sheet mounted on said support wheel for rotation therewith about said axis and having thereon a plurality of questions arranged in a first circular path about said axis and a corresponding plurality of answers arranged in a second circular path by the said axis and a plurality of answer spaces arranged in a third circular path about said axis, the number of said answer spaces corresponding to the number of said questions on said test sheet and work sheet, a cover overlying and covering said support wheel and said test sheet and work sheet, a first window in said cover and overlying said first circular path for displaying a question to be answered therethrough, a second window in said cover and overlying said third circular path for displaying the answer space therethrough, a third window in said cover and overlying said second path for displaying the answer corresponding to the question previously displayed through said first window, a fourth window in said cover and overlying said third circular path at a point disposed circumferentially from said second window for displaying therethrough the answer corresponding to the question previously displayed through said first window, and means for rotating said support wheel with said test sheet and work sheet thereon with respect to said cover and said windows therein, whereby successively to display a question to be answered through said first window and the corresponding answer space through said second window while simultaneously displaying the answer to the preceding question through said third window and the corresponding answer space through said fourth window.

15. A teaching device comprising a support wheel mounted for rotation about an axis, a test sheet mounted on said support wheel for rotation therewith about said axis and having thereon a plurality of questions arranged in a first circular path about said axis and a corresponding plurality of answers arranged in a second circular path about said axis, a work sheet separate from said test sheet and mounted on said support wheel for rotation therewith about said axis and having thereon a plurality of answer spaces arranged in a third circular path about said axis, the number of said answer spaces corresponding to the number of said questions on said test sheet, a cover overlying and covering said support wheel and said test sheet and said work sheet, a first window in said cover and overlying said first circular path for displaying a question to be answered therethrough, a second window in said cover and overlying said third circular path for displaying the answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough the answer on said work sheet corresponding to the question displayed through said third window, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window.

16. A teaching device comprising a support wheel mounted for rotation about an axis, a test sheet mounted on said support wheel for rotation therewith about said axis and having thereon a plurality of questions arranged in a first circular path about said axis and a corresponding plurality of answers arranged in a second circular path about said axis, a work sheet separate from said test sheet and mounted on said support wheel for rotation therewith about said axis and having thereon a plurality of answer spaces arranged in a third circular path about said axis and a corresponding plurality of scoring spaces arranged in a fourth circular path about said axis, the number of said answer spaces and said scoring spaces corresponding to the number of said questions on said test sheet, a cover overlying and covering said support wheel and said test sheet and said work sheet, a first window in said cover and overlying said first circular path for displaying a question to be answered therethrough, a second window in said cover and overlying said third circular path for displaying the answer space therethrough, a third window in said cover and overlying said first circular path at a point circumferentially spaced with respect to said first window for displaying the preceding question therethrough, a fourth window in said cover and overlying said second path for displaying the answer on said test sheet corresponding to the question displayed through said third window, a fifth window in said cover and overlying said third circular path at a point disposed circumferentially from said second window for displaying therethrough the answer on said work sheet corresponding to the question displayed through said third window, a sixth window in said cover and overlying said fourth circular path for displaying therethrough the scoring space corresponding to the question displayed through said third window, and means for rotating said support wheel with said test sheet and said work sheet thereon with respect to said cover and said windows therein, whereby successively to display a question to be answered on said test sheet through said first window and the corresponding answer space on said work sheet through said second window while simultaneously displaying the previous question on said test sheet through said third window and the corresponding answer on said test sheet through said fourth window and the corresponding answer space on said work sheet through said fifth window and the corresponding scoring space on said work sheet through said sixth window.

17. A teaching device for use with a test sheet and work sheet having thereon a plurality of questions arranged in a first path and a corresponding plurality of answers arranged in a second path uniformly spaced from and conjugate with the first path and a plurality of answer spaces arranged in a third path uniformly spaced from and conjugate with the first path, said teaching device comprising a support wheel including means for receiving and mounting an associated test sheet and work sheet, a cover mounted for covering said support wheel and the associated test sheet and work sheet mounted thereon, a first window in said cover adapted to overlie the first path for displaying a question to be answered therethrough, a second window in said cover adapted to overlie the third path for displaying an answer space therethrough, a third window in said cover and adapted to overlie the second path for displaying the answer corresponding to the question previously displayed through said first window, a fourth window in said cover and adapted to overlie the third path at a point spaced from said second window for displaying therethrough the answer space corresponding to the question previously displayed through said first window, and means for moving said support wheel with the associated test sheet and work sheet thereon and said cover with said windows therein with respect to each other along a predetermined path, whereby successively to display a question to be answered through said first window and the corresponding answer space through said second window while simultaneously displaying the answer to the preceding question through said third window and the corresponding answer space through said fourth window.

18. A teaching device for use with a test sheet and work sheet having thereon a plurality of questions arranged in a first path and a corresponding plurality of answers arranged in a second path uniformly spaced from and conjugate with the first path and a plurality of answer spaces arranged in a third path uniformly spaced from and conjugate with the first path, said teaching device comprising a support wheel mounted for movement along a predetermined path and including means for removably receiving and mounting an associated test sheet and work sheet, a cover removably mounted for covering said support wheel and the associated test sheet and work sheet mounted therein, a first window in said cover adapted to overlie the first path for displaying a question to be answered therethrough, a second window in said cover adapted to overlie the third path for displaying an answer space therethrough, a third window in said cover and adapted to overlie the second path for displaying the answer corresponding to the question previously displayed through said first window, a fourth window in said cover and adapted to overlie the third path at a point spaced from said second window for displaying therethrough the answer space corresponding to the question previously displayed through said first window, and means for moving said support wheel with the associated test sheet and work sheet thereon along said predetermined path and with respect to said cover with said windows therein, whereby successively to display a question to be answered through said first window and the corresponding answer space through said second window while simultaneously displaying the answer to the preceding question through said third window and the corresponding answer space through said fourth window.

19. A teaching device for use with a test sheet and work sheet having thereon a plurality of questions arranged in a first path and a corresponding plurality of answers arranged in a second path uniformly spaced from and conjugate with the first path and a plurality of answer spaces arranged in a third path uniformly spaced from and conjugate with the first path, said teaching device comprising a cover mounted for covering said support wheel and the associated test sheet and work sheet mounted thereon, a first window in said cover adapted to overlie the first path for displaying a question to be answered therethrough, a second window in said cover adapted to overlie the third path for displaying an answer space therethrough, a third window in said cover and adapted to overlie the first path at a point spaced from said first window for displaying the preceding question therethrough, a fourth window in said cover adapted to overlie the second path for displaying the answer corresponding to the question displayed through said third window, a fifth window in said cover and adapted to overlie the third path at a point spaced from said second window for displaying therethrough the answer space corresponding to the question displayed through said third window, and means for rotating said support wheel with the associated test sheet and work sheet thereon with respect to said cover with said windows therein, whereby successively to display a question to be answered through said first window and the corresponding answer space through said second window while simultaneously displaying the previous question through said third window and the corresponding answer through said fourth window and the corresponding answer space through said fifth window.

20. A teaching device for use with a test sheet and work sheet having thereon a plurality of questions arranged in a first path and a corresponding plurality of answers arranged in a second path uniformly spaced from and conjugated with the first path and a plurality of answer spaces arranged in a third path uniformly spaced from and conjugate with the first path, and a corresponding plurality of scoring spaces arranged in a fourth path uniformly spaced from and conjugate with the first path, said teaching device comprising a cover mounted for covering said support wheel and the associated test sheet and work sheet mounted thereon, a first window in said cover adapted to overlie the first path for displaying a question to be answered therethrough, a second window in said cover adapted to overlie the third path for displaying an answer space therethrough, a third window in said cover and adapted to overlie the first path at a point spaced from said first window for displaying the preceding question therethrough, a fourth window in said cover adapted to overlie the second path for displaying the answer corresponding to the question displayed through said third window, a fifth window in said cover and adapted to overlie the third path at a point spaced from said second window for displaying therethrough the answer space corresponding to the question displayed through said third window, a sixth window in said cover and adapted to overlie the fourth path for displaying therethrough the scoring space corresponding to the question displayed through said third window, and means for rotating said support wheel with the associated test sheet and work sheet thereon with respect to said cover with said windows therein, whereby successively to display a question to be answered through said first window and the corresponding answer space through said second window while simultaneously displaying the previons question through said third window and the corresponding answer through said fourth window and the corresponding answer space through said fifth window, and the corresponding scoring space through said sixth window.

21. A teaching device for use with a test sheet and work sheet having thereon a plurality of questions arranged in a first path and a corresponding plurality of answers arranged in a second path uniformly spaced from and conjugate with the first path and a plurality of answer spaces arranged in a third path uniformly spaced from and conjugate with the first path, said teaching device comprising a support wheel including means for receiving and mounting an associated test sheet and work sheet, a cover mounted for covering said support wheel and the associated test sheet and a work sheet mounted thereon, window structure in said cover adapted to overlie a portion of the first path and the second path and the third path of the associated test sheet and work sheet for simultaneously displaying a question to be answered on the first path and a corresponding answer space on the third path and the answer on the second path corresponding to the preceding question and the answer space on the third path corresponding to the preceding question, and means for moving said support wheel with the associated test sheet and work sheet thereon and said cover with said window structure therein with respect to each other along a predetermined path, whereby successively to display through said window structure a question to be answered and the corresponding answer space while simultaneously displaying the answer to the preceding question and the corresponding answer space.

22. A teaching device for use with a test sheet and work sheet having thereon a plurality of questions arranged in a first path and a corresponding plurality of answers arranged in a second path uniformly spaced from and conjugate with the first path and a plurality of answer spaces arranged in a third path uniformly spaced from and conjugate with the first path, said teaching device comprising a support wheel including means for receiving and mounting an associated test sheet and work sheet, a cover mounted for covering said supoprt wheel and the associated test sheet and work sheet mounted thereon, window structure in said cover adapted to overlie a portion of the first path and the second path and the third path of the associated test sheet and work sheet for simultaneously displaying a question to be answered on the first path and a corresponding answer space on the third path and the answer on the second path corresponding to the preceding question and the answer space on the third path corresponding to the preceding question, transparent pane structure in said window structure overlying the question to be answered on the first path and the answer on the second path corresponding to the preceding question and the answer space on the third path corresponding to the preceding question for preventing access to the material thereunder while permitting viewing thereof therethrough, and means for moving said support wheel with the associated test sheet and work sheet thereon and said cover with said window structure therein with respect to each other along a predetermined path, whereby successively to display through said window structure a question to be answered and the corresponding answer space while simultaneously displaying the answer to the preceding question and the corresponding answer space.

23. A teaching device for use with a test sheet and work sheet having thereon a plurality of questions arranged in a first circular path and a corresponding plurality of answers arranged in a second circular path concentric with the first circular path and a plurality of answer spaces arranged in a third circular path concentric with the first circular path, said teaching device comprising a support wheel mounted for rotation about an axis and including means for receiving and mounting an associated test sheet and work sheet with the circular paths thereon concentric with said axis, a cover mounted for covering said support wheel and the associated test sheet and work sheet mounted thereon, window structure in said cover adapted to overlie portions of the first and second and third paths on an associated test sheet and work sheet for simultaneously displaying therethrough a question to be answered on the first circular path and the corresponding answer space on the third circular path and the answer corresponding to the preceding question on the second path and the answer corresponding to the preceding question on the third path, and means for rotating said support wheel with the associated test sheet and work sheet thereon and said cover with said window structure therein with respect to each other, whereby successively to display through said window structure a question to be answered and the corresponding answer space while simultaneously displaying the answer to the preceding question and the corresponding answer space.

24. A teaching device for use with a test sheet and work sheet having thereon a plurality of questions arranged in a first circular path and a corresponding plurality of answers arranged in a second circular path concentric with the first circular path and a plurality of answer spaces arranged in a third circular path concentric with the first circular path, said teaching device comprising a support wheel mounted for rotation about an axis and including means for receiving and mounting an associated test sheet and work sheet with the circular paths thereon concentric with said axis, a cover mounted for covering said support wheel and the associated test sheet and work sheet mounted thereon, window structure in said cover adapted to overlie portions of the first and second and third paths on an associated test sheet and work sheet for simultaneously displaying therethrough a question to be answered on the first circular path and the corresponding answer space on the third circular path and the answer corresponding to the preceding question on the second path and the answer corresponding to the preceding question on the third path, transparent pane structure in said window structure overlying the question to be answered on the first path and the answer on the second path corresponding to the question previously displayed and the answer space on the third path corresponding to the question previously displayed for preventing access to the material thereunder while permitting viewing thereof therethrough, and means for rotating said support wheel with the associated test sheet and work sheet thereon and said cover with said window structure therein with respect to each other, whereby successively to display through said window structure a question to be answered and the corresponding answer space while simultaneously displaying the answer to the preceding question and the corresponding answer space.

References Cited in the file of this patent

UNITED STATES PATENTS

| | | |
|---|---|---|
| 1,329,896 | Frome | Feb. 3, 1920 |
| 1,641,982 | McDade | Sept. 13, 1927 |
| 1,816,760 | Barnowitz | July 28, 1931 |
| 2,092,577 | Hornung | Sept. 7, 1937 |
| 2,169,266 | Matter | Aug. 25, 1939 |
| 2,560,647 | Higgins | July 17, 1951 |
| 2,663,091 | Brown | Dec. 22, 1953 |
| 2,877,567 | Studebaker et al. | Mar. 17, 1959 |
| 2,924,025 | Salisbury et al. | Feb. 9, 1960 |
| 2,987,828 | Skinner | June 13, 1961 |